(12) United States Patent
Guo et al.

(10) Patent No.: US 6,873,490 B2
(45) Date of Patent: Mar. 29, 2005

(54) CONTROL OBJECT POSITIONING USING JERK, CURRENT AND TIME OPTIMIZED CONTROL PROFILES

(75) Inventors: HengChang Guo, Singapore (SG); ChoonHoe Koh, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 118 days.

(21) Appl. No.: 10/465,500

(22) Filed: Jun. 19, 2003

(65) Prior Publication Data

US 2004/0070863 A1 Apr. 15, 2004

Related U.S. Application Data

(60) Provisional application No. 60/417,617, filed on Oct. 10, 2002.

(51) Int. Cl.[7] .................. G11B 5/596; G05B 19/407
(52) U.S. Cl. ............... 360/78.07; 360/78.09; 360/78.06; 318/568.18
(58) Field of Search ............... 360/75, 78.04, 360/78.06, 78.07, 78.09, 77.02; 318/560, 561, 568.18, 567

(56) References Cited

U.S. PATENT DOCUMENTS

| | | |
|---|---|---|
| 5,668,680 A | 9/1997 | Tremaine |
| 5,901,009 A | 5/1999 | Sri-Jayantha et al. |
| 6,002,971 A | 12/1999 | Lucas |
| 6,011,373 A | 1/2000 | McConnell et al. |
| 6,114,825 A | 9/2000 | Katz |
| 6,148,240 A | 11/2000 | Wang et al. |
| 6,166,876 A | 12/2000 | Liu |
| 6,178,060 B1 | 1/2001 | Liu |
| 6,256,163 B1 | 7/2001 | Schmidt et al. |
| 6,294,891 B1 | 9/2001 | McConnell et al. |
| 6,320,345 B1 | 11/2001 | Yuan et al. |
| 6,724,564 B1 * | 4/2004 | Codilian et al. ......... 360/78.07 |
| 2002/0048113 A1 * | 4/2002 | Chu et al. ............... 360/78.07 |

OTHER PUBLICATIONS

Y. Mizoshita et al., "Vibration Minimized Access Control for Disk Drives," IEEE Transactions on Magnetics, IEEE, vol. 32 ( No. 3), p. 1793–1798, (May 3, 1996).

* cited by examiner

Primary Examiner—Andrew L. Sniezek
(74) Attorney, Agent, or Firm—David K. Lucente; Derek J. Berger

(57) ABSTRACT

Method and apparatus for moving a control object, such as a data transducing head in a data storage device, from an initial position to a destination position. A base generation term describes a normalized trajectory (acceleration, velocity, displacement) of the control object away from the initial position and toward the destination position. A control profile is determined in relation to the base generation term as well as in relation to an acceleration distance and an acceleration time, respectively characterized as a displacement distance and an elapsed time during which the control object is accelerated. The control object is then moved in relation to the control profile. The base generation term is preferably stored in a table which is accessed and scaled in relation to the displacement distance (seek length) for the control object.

25 Claims, 8 Drawing Sheets

US 6,873,490 B2

CONTROL OBJECT POSITIONING USING JERK, CURRENT AND TIME OPTIMIZED CONTROL PROFILES

RELATED APPLICATIONS

The present application makes a claim of domestic priority under 35 U.S.C. §119(e) to U.S. Provisional Patent Application No. 60/417,617 filed Oct. 10, 2002.

FIELD OF THE INVENTION

This invention relates generally to the positioning of control objects, and more particularly, but not by way of limitation, to a servo control circuit in a data storage device which moves a data transducing head adjacent a data recording surface in relation to an optimized control profile to reduce excitation of mechanical resonances in an actuator structure used to support the head.

BACKGROUND

Disc drives are data storage devices used to store and retrieve digital user data in a fast and efficient manner. A typical disc drive stores data on a number of magnetic recording discs which are rotated at a constant high speed. An actuator controllably moves a corresponding number of data transducing heads to access data stored in tracks defined on the disc surfaces.

Servo data are written to the discs during disc drive manufacturing to provide head positional information to a closed loop servo control circuit. The servo data are used by the servo control circuit to maintain a selected head over a selected track in a track following operation, and to move a selected head from an initial track to a different, destination track during a seek operation.

Since data storage devices are generally configured to transfer user data during track following operations, minimizing the time spent seeking to different tracks will generally tend to improve overall data transfer rates.

While a variety of seek strategies have been found operable, with continued demand for data storage devices with higher data storage capacities and better performance, there remains a continued need for improvements in the manner in which seeks are carried out in a data storage device. More generally, there remains a continued need for improvements in the art to control the movement of any number of different types of control objects, including actuators in data storage devices, from an initial position to a destination position.

SUMMARY OF THE INVENTION

As embodied herein and as claimed below, the present invention is generally directed to a method and apparatus for moving a control object, such as a data transducing head in a data storage device, from an initial position to a destination position.

The method preferably includes providing a base generation term to describe a normalized trajectory of the control object away from the initial position and toward the destination position. Preferably, the base generation term is characterized as an at least sixth order time domain polynomial.

A control profile is next determined in relation to the base generation term, as well as in relation to an acceleration distance and an acceleration time. The acceleration distance is characterized as a displacement distance over which the control object is accelerated, and the acceleration time is characterized as an elapsed time during which the control object is accelerated. The control object is thereafter moved in relation to the control profile.

Preferably, the control profile is further configured to include a deceleration portion which is generated in relation to the base generation term as well as a deceleration distance and a deceleration time. For longer seeks, the control profile further preferably comprises a coast portion for a coast distance and an elapsed coast time during which the control object is allowed to coast at a maximum velocity between acceleration and deceleration.

The apparatus preferably includes a table comprising values representative of the base generation term, a reference generator which generates the control profile in relation to the base generation term, the acceleration distance and the acceleration time, and a driver circuit which applies current to move the control object in relation to the control profile.

The control profile can be used in an open loop fashion so that current command values are generated directly and applied to move the control object, or in a closed loop fashion so that the control profile is used as a reference which is combined with an estimated state of the control object to generate a sequence of error values which are used to move the control object in a reference position (model reference) mode. Jerk characteristics (change in acceleration with respect to time) are well controlled and approximate optimum response levels, leading to efficient movement operations with reduced excitation of mechanical resonances.

These and various other features and advantages which characterize the claimed invention will be apparent from a reading of the following detailed description and a review of the associated drawings.

DETAILED DESCRIPTION

Figure 1:
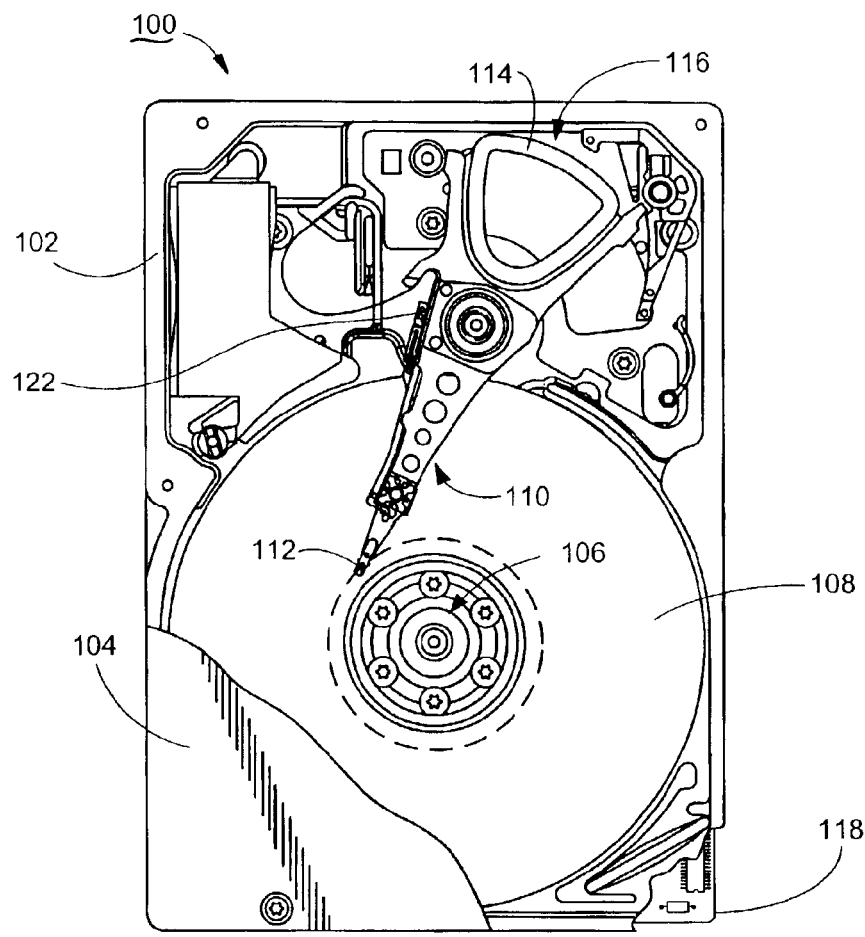
FIG. 1 is a top plan view of a data storage device constructed and operated in accordance with preferred embodiments of the present invention.

To provide an exemplary environment in which presently preferred embodiments of the present invention can be advantageously practiced, FIG. 1 shows a data storage device 100 of the type used to store and retrieve digital data. A base deck 102 cooperates with a top cover 104 (shown in partial cutaway) to form an environmentally controlled housing for the drive 100.

A spindle motor 106 supported within the housing rotates a number of rigid magnetic recording discs 108 at a constant high operational speed. An actuator 110 is provided adjacent the discs 108 and moves a corresponding number of heads 112 across the disc recording surfaces through application of current to an actuator coil 114 of a voice coil motor (VCM) 116. Command and control electronics for the device 100 are provided on a printed circuit board (PCB) 118 mounted to the underside of the base deck 102 (a corner of the base deck 102 is shown in cutaway fashion to reveal a portion of the PCB 118).

Figure 2:
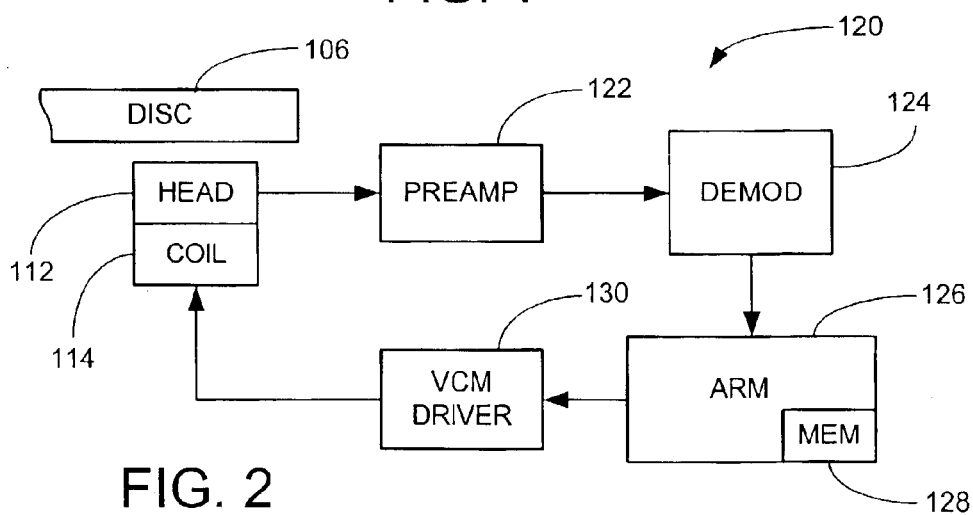
FIG. 2 is a functional block diagram of a servo control circuit of the data storage device of claim 1.

FIG. 2 shows a functional block diagram of a closed loop servo control circuit 120 of the device 100. Servo data (not shown) are written to the various recording surfaces of the discs 108 to define a number of concentric tracks on the recording surfaces. User data from a host device are stored in data sectors (also not shown) arranged on the various tracks.

During operation of the servo control circuit 120, servo data readback signals are transduced from a selected disc surface by the associated head 112 and preamplified and filtered by a preamplifier/driver circuit (preamp) 122. The preamp 122 is preferably mounted to the side of the actuator 110, as shown in FIG. 1.

The preamplified readback signals are conditioned by a demodulation circuit (demod) 124, including conversion to digital form. An ARM (advanced RISC (reduced instruction set computer) machine) device 126 utilizes programming stored in ARM memory (MEM) 128 to process the demodulated servo data and output current command signals to a VCM driver circuit 130. The VCM driver circuit 130, in turn, adjusts the current applied to the actuator coil 114 to move the selected head 112 accordingly.

The servo control circuit 120 operates in two primary modes: track following, and seeking. Track following generally entails maintaining a selected head 112 over a selected track on the corresponding disc recording surface. Seeking generally entails the controlled movement of the selected head 112 from an initial track to a different, destination track on the corresponding recording surface.

It is generally desirable to minimize the time required to move the heads 112 during seek operations in order to achieve higher data transfer rate performance, since user data transfers to and from the user data sectors generally only occur while the servo control circuit 120 is in track following mode.

Accordingly, preferred embodiments of the present invention are generally directed to a seek strategy that can be advantageously utilized by the servo control circuit 120 to carry out seeks of any desired length. It will be readily understood, however, that the seek strategy can be readily adapted for use in any number of other types of control systems in which a control object is moved from an initial position to a destination position.

The seek strategy is preferably formulated as follows. Equation set (1a) sets forth what will be referred to herein as acceleration, velocity and displacement trajectory generation formulae, respectively:

$$G_a(\tau)=(A6)(\tau)^6+(A5)(\tau)^5+(A4)(\tau)^4+(A3)(\tau)^3+(A2)(\tau)^2+(A1)(\tau)$$

$$G_v(\tau)=(B7)(\tau)^7+(B6)(\tau)^6+(B5)(\tau)^5+(B4)(\tau)^4+(B3)(\tau)^3+(B2)(\tau)^2 \quad (1a)$$

$$G_x(\tau)=(C8)(\tau)^8+(C7)(\tau)^7+(C6)(\tau)^6+(C5)(\tau)^5+(C4)(\tau)^4+(C3)(\tau)^3$$

Where $G_a(\tau)$ is an acceleration generation term, $G_v(\tau)$ is a velocity generation term, and $G_x(\tau)$ is a displacement (position) generation term. The value $\tau$ is a normalized time value that ranges from 0 to 1, and A, B and C represent various coefficients for the multi-order polynomials. The coefficients A, B and C can vary depending upon the application, and can be obtained using suitable analysis software. Preferred values for the A, B and C coefficients are given in equation set (1b):

$$G_a(\tau)=(-17)(\tau)^6+(68)(\tau)^5+(-1984/15)(\tau)^4+(684/5)(\tau)^3+(-1133/15)(\tau)^2+(20)(\tau)$$

$$G_v(\tau)=(-17/7)(\tau)^7+(34/3)(\tau)^6+(-1984/75)(\tau)^5+(171/5)(\tau)^4+(-1133/45)(\tau)^3+(10)(\tau)^2 \quad (1b)$$

$$G_x(\tau)=(17/56)(\tau)^8+(34/21)(\tau)^7+(-992/225)(\tau)^6+(171/25)(\tau)^5+(-1133/180)(\tau)^4+(10/3)(\tau)^3$$

The acceleration stage of a reference seek is next formulated. The acceleration stage is defined as that portion of time during which a control effort is provided by the servo control circuit 120 to accelerate the head 112 away from the initial track and toward the destination track.

Time-based acceleration, velocity and position functions are provided as follows:

$$a_a(t)=(D)(X_a/T^2_a)G_a(t/T_a)$$

$$v_a(t)=(D)(X_a/T_a)G_v(t/T_a) \quad (2)$$

$$x_a(t)=(D)(X_a)G_x(t/T_a)$$

where $a_a(t)$ is the acceleration function, $v_a(t)$ is the velocity function and $x_a(t)$ is the position function. $T_a$ is the time interval (duration) of the acceleration stage, and t is a time increment from 0 to $T_a$. The value D is a selected constant, and is preferably set equal to the value D=4200/3299. The values of $G_a(t/T_a)$, $G_v(t/T_a)$ and $G_x(t/T_a)$ are obtained from equation (1) with $\tau=(t/T_a)$.

Since acceleration is proportional to current by a factor defined as Kpt (with Kpt representing a gain of the servo control circuit 120), a current function $i_a(t)$ can further be defined as:

$$i_a(t)=(Kpt)(D)(X_a/T^2_a)G_a(t/T_a) \quad (2a)$$

The following constraints (boundary conditions) are satisfied during the acceleration stage:

$$a_a(0)=0$$

$$a_a(T_a)=0$$

$$v_a(0)=0 \quad (3)$$

$$v_a(T_a)=(F)(X_a/T_a)$$

$$x_a(0)=0$$

$$x_a(T_a)=X_a$$

that is, the acceleration of the head 112 at t=0 (the beginning of the acceleration stage) is zero, the acceleration of the head 112 at t=$T_a$ (the end of the acceleration stage) is zero, and the initial velocity at t=0 is zero. The final velocity at t=$T_a$ is determined by the total displacement distance $X_a$, acceleration time $T_a$ and a constant F (preferably set equal to a value of 18,568/9897). The initial position of the head 112 is identified as a zero displacement position, and the final position is equal to the total displacement distance $X_a$.

Figure 3:
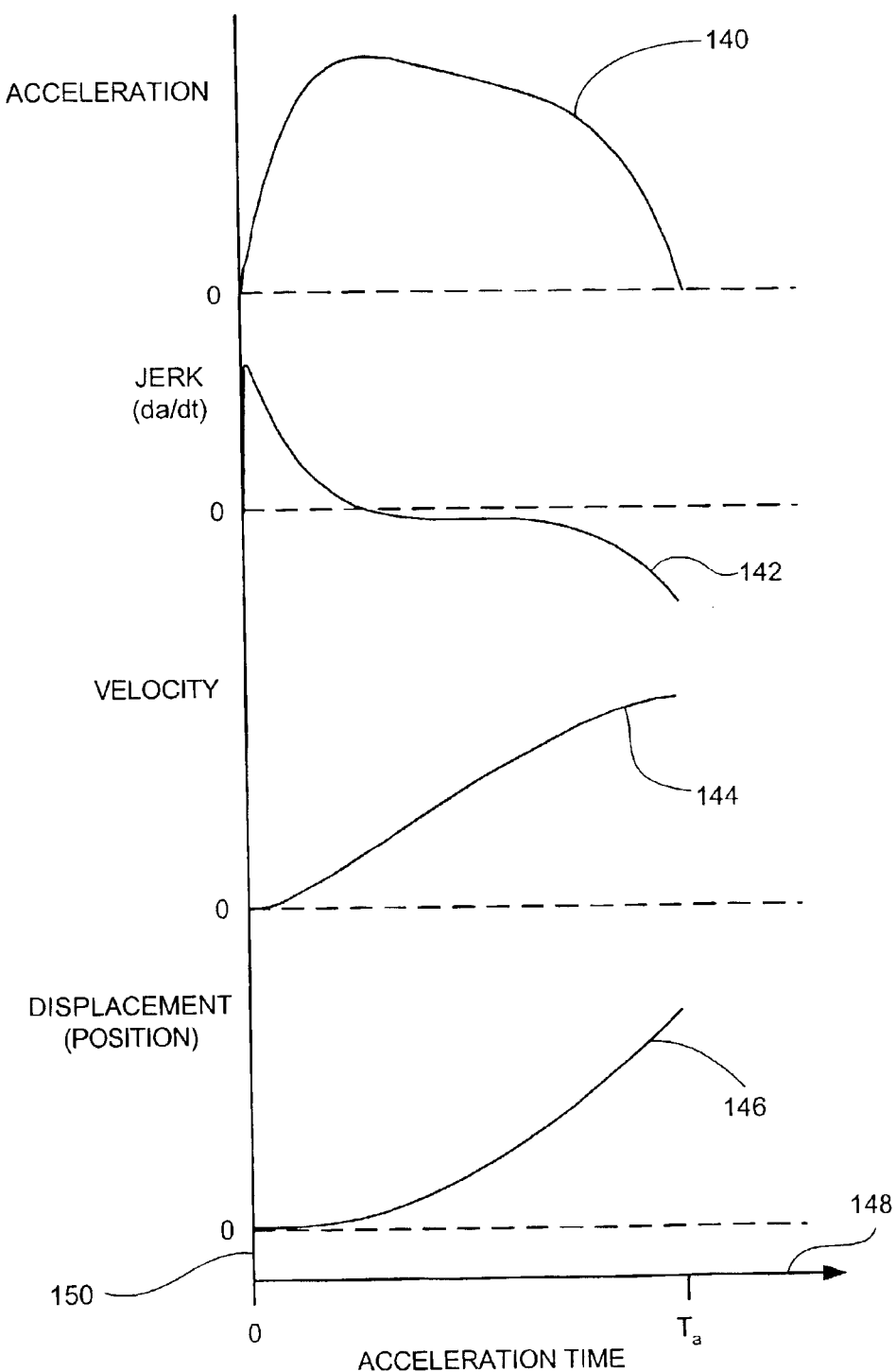
FIG. 3 provides graphical representations of acceleration, jerk, velocity and displacement curves during an acceleration stage.

FIG. 3 provides a graphical representation of an acceleration curve 140, a jerk curve 142, a velocity curve 144 and a position curve 146 determined in accordance with equation (2). These curves are plotted against a common elapsed time x-axis 148 (acceleration time from t=0 to $T_a$) and a common amplitude y-axis 150.

The jerk curve 142 is determined by a jerk function $j_a(t)$ which represents the change in acceleration with respect to time (i.e., $di_a(t)/dt$). As those skilled in the art will appreciate, providing smooth jerk characteristics as that shown by FIG. 3 will generally tend to reduce the excitation of mechanical resonances in the actuator structure. Based on the derivations above, it has been found that the jerk function $j_a(t)$ of curve 142 can be approximated as:

$$j_a(t)=(25)(X_a/T^3_a) \quad (4)$$

which approaches a minimal jerk cost function and thus provides excellent response.

It is envisioned that the formulae of equation (2) and the corresponding curves of FIG. 3 define an optimal set of control profiles that can be utilized in a number of different ways to control the movement of the head 112, without limitation. In a preferred approach, an "open loop" scheme is employed wherein current is applied to the VCM 116 in relation to the values of the current profile equation (2a), resulting in the head 112 nominally following the various acceleration, jerk, velocity and displacement trajectories as defined by FIG. 3.

In another preferred approach, a closed loop velocity-controlled scheme can be used wherein the actual velocity of the head is measured and compared to the profile velocity of curve 144. The current applied to the VCM 116 is adjusted in relation to velocity error so as to cause the head 112 to nominally follow the control profiles of FIG. 3.

Yet another preferred approach employs a closed loop reference position scheme wherein at least selected ones of the position, velocity and acceleration curves are used as references models. The corresponding actual position, velocity, acceleration etc. of the head 112 during the seek are measured or estimated. The current is applied to the VCM 116 in relation to the error between the actual values and the reference values so that, as before, the head 112 nominally follows the control profiles to the destination track.

It is contemplated that different ones of these schemes may be carried out by the device 100 for different seek lengths; for example, a model reference approach may be taken for short seeks under a transition limit such as 20 tracks, and an open loop approach may be taken for longer seeks above the transition limit.

Irrespective of the control scheme employed, it will be readily apparent that the control profiles can generally only be utilized reliably if the current commanded to flow through the VCM coil 114 at any given time is equal to or less than the maximum available current that can be supplied by the VCM driver 130. Otherwise, the final state of the head 112 will be different than that identified by the profiles, leading to an undesired extension of the time required to get the head to the final destination.

During the acceleration stage, the potential u(t) across the VCM coil 114 can be represented in accordance with the following relation:

$$u(t)=(R)i(t)+V_{BEMF}(t) \quad (5)$$

where R is the electrical resistance of the coil 114, i(t) is the current flowing through the coil 114 and $V_{BEMF}(t)$ is the time-varying back electromotive force (BEMF) voltage generated by movement of the coil 114 within the VCM 116.

Because $V_{BEMF}(t)$ is proportional to the velocity of the coil 114, equation (5) can be rewritten as:

$$u(t)=(R)i(t)+(K_{BEMF})v(t) \quad (6)$$

where v(t) is the velocity of the coil 114 and $K_{BEMF}$ is the BEMF constant of the coil 114. The BEMF constant is equal to, or proportional to, the torque constant of the VCM 116 (depending upon the unit convention employed) and is determined by the construction of the VCM 116.

Defining a value K as follows, $$K=K_{BEMF}/R \quad (7)$$

and considering the relationship between current and acceleration, equation (6) can be generally written as:

$$u(t)=a_a(t)+(K)v_a(t) \quad (8)$$

Figure 4:
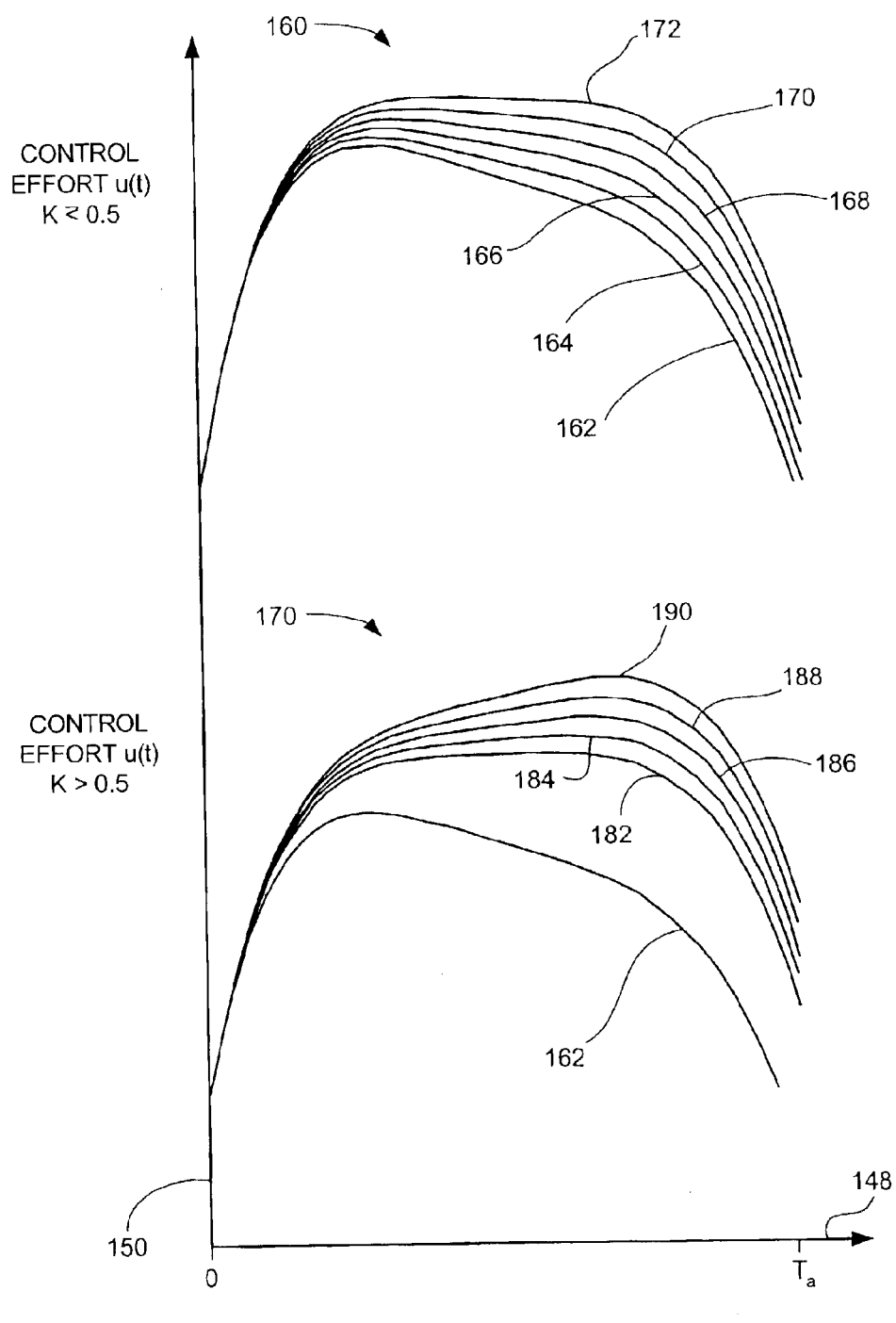
FIG. 4 illustrates different control effort values for different ratios of back electromotive force (BEMF) constant to coil resistance ratios for the voice coil motor (VCM) of the data storage device.

From equation (2), various plots of u(t) can be obtained for various values of K, as shown in FIG. 4. FIG. 4 shows a first set of curves 160 for values of K≦0; more particularly, curve 162 has a value of K=0, curve 164 has a value of K=0.1, curve 166 has a value of K=0.2, curve 168 have a value of K=0.3, curve 170 has a value of K=0.4 and curve 172 has a value of K=0.5.

FIG. 4 further shows a second set of curves 180 for values of K>0.5, as well as a second copy of the curve 162 (which has a value of K=0). The second set of curves 180 includes curve 182 with a value of K=0.6, curve 184 with a value of K=0.7, curve 186 with a value of K=0.8, curve 188 with a value of K=0.9 and curve 190 with a value of K=1.

It can readily be observed from FIG. 4 that for K≦0.5, the peaks of the u(t) curves tend to centralize near the point where the seek starts and generally correspond to the location of the peak of the acceleration curve 140 (FIG. 3). Conversely, for K>0.5, the peaks of the u(t) curves tend to concentrate near the end of the acceleration stage away from the peak acceleration.

It follows that the VCM 116 will generally not saturate if the peak of u(t) is located as set forth in the first set of curves 160. In other words, if K is maintained as less than or equal to 0.5, the servo control circuit 120 need not bother about the effects of BEMF on the fly. This simplifies the control process and ensures the model will be followed during the acceleration phase.

As defined above in equation (7), the value of K is determined by the ratio of the BEMF constant to the coil resistance. The BEMF constant is a function of the construction of the VCM (primarily magnetic field strength). The coil resistance is a function of the length, diameter and material makeup of the coil wire.

Depending upon construction, coil resistance will often be a relatively small value such as on the order of 4 to 20 ohms. This means that the desired K value range can be readily achieved so long as the BEMF constant is correspondingly selected to a sufficiently high enough value.

Having now defined the acceleration stage, the next step is to consider deceleration of the head 112 during the seek. An appropriate deceleration stage can be developed by inverting the acceleration stage, and by mirroring the acceleration stage. Each of these approaches will be discussed in turn.

Using an inversion scheme, a set of deceleration control profiles can be obtained as follows. Set $T_d$ to be the time interval during which the head 112 is decelerated, and set $X_d$ as the distance over which the head 112 is decelerated. The total seek time T will be:

$$T=T_a+T_d \quad (9)$$

and the total seek displacement distance X will be:

$$X=X_a+X_d \quad (10)$$

It has been found that the peak current at deceleration can be $(T_a/T_d)$ times that of the acceleration stage, which is particularly useful for long seeks because the available current at the commencement of deceleration will often be larger than that at the commencement of acceleration due to the existence of favorable BEMF. The deceleration time $T_d$ can be set equal to the acceleration time $T_a$ (i.e., $T_a=T_d$), or the deceleration time $T_d$ can be different from the acceleration time $T_a$ (i.e., $T_a \neq T_d$).

The following relationships define the deceleration stage for the inversion scheme:

$$a_d(t)=(-D)(X_a/T^2_a)(T_a/T_d)G_a((t-T_a)/T_d)$$

$$v_d(t)=(-D)(X_a/T_a)G_v((t-T_a)/T_d)+(F)(X_a/T_a) \quad (11)$$

$$x_d(t)=(-D)(X_a)(T_d/T_a)G_x((t-T_a)/T_d)+(F)(X_a/T_a)(T_d)((t-T_a)/T_d)$$

$$X_d=(H)(T_d/T_a)(X_a)$$

$$X=X_a+X_d=(1+(H)(T_d/T_a))X_a$$

where $a_d(t)$ is the deceleration function, $v_d(t)$ is the decelerating velocity function and $x_d(t)$ is the decelerating position function. $T_d$ is the time interval (duration) of the deceleration stage, and t is a time increment from 0 to T. The value D is a selected constant, and is preferably set equal to the value D=(4200/3299) as before in equation (2). The value F is also a selected constant, and is preferably set equal to (18,589/9897) as before in equation (3). The value H is a selected constant preferably set equal to (8671/9897). The values of $G_a((t-T_a)/T_d)$, $G_v((t-T_a)/T_d)$ and $G_x((t-T_a)/T_d)$ are obtained from equation (1) with $\tau=((t-T_a)/T_d)$.

Figure 5:
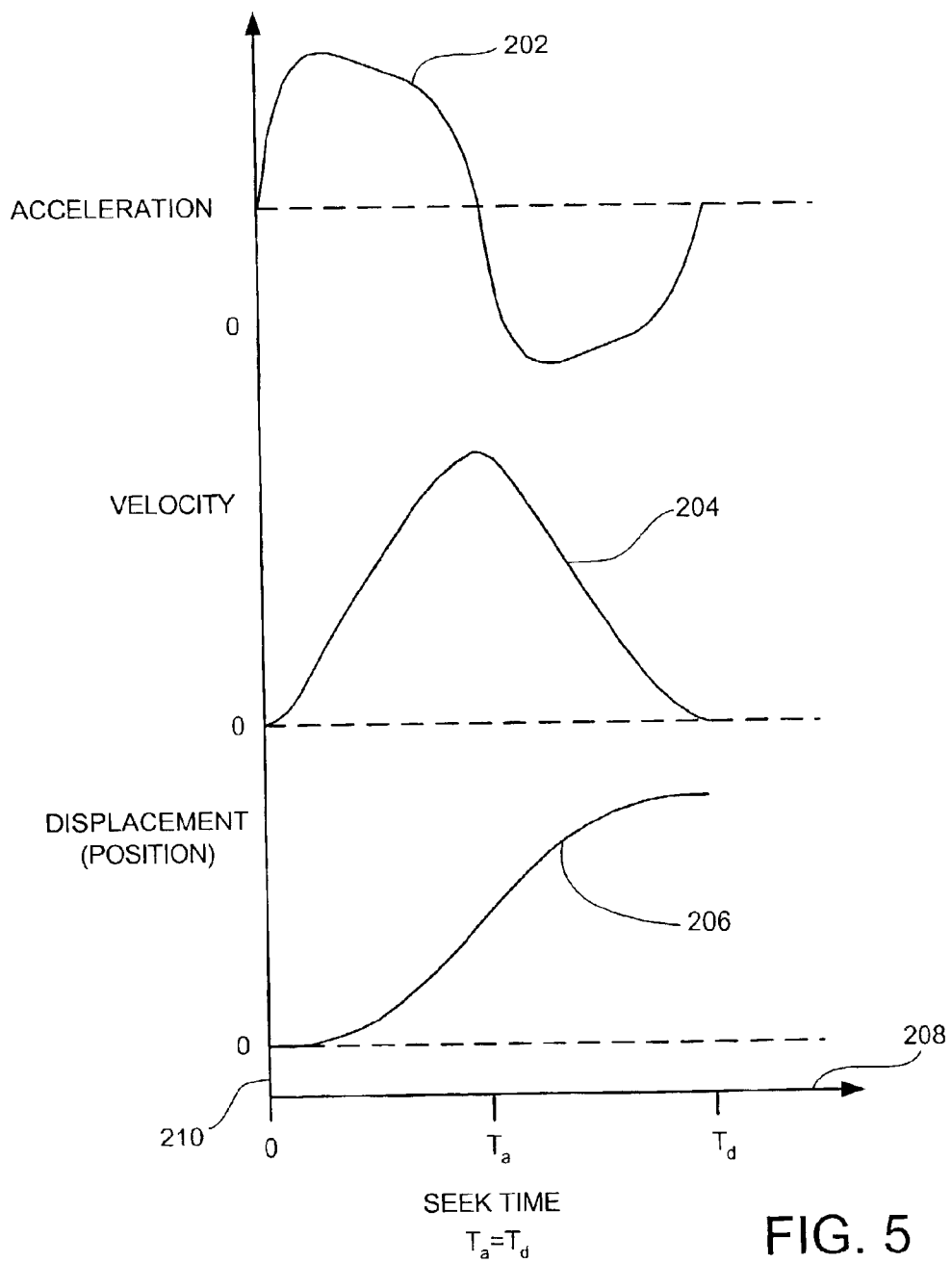
FIG. 5 provides control profiles for acceleration, velocity and displacement when the acceleration time is set equal to the deceleration time.
Figure 6:
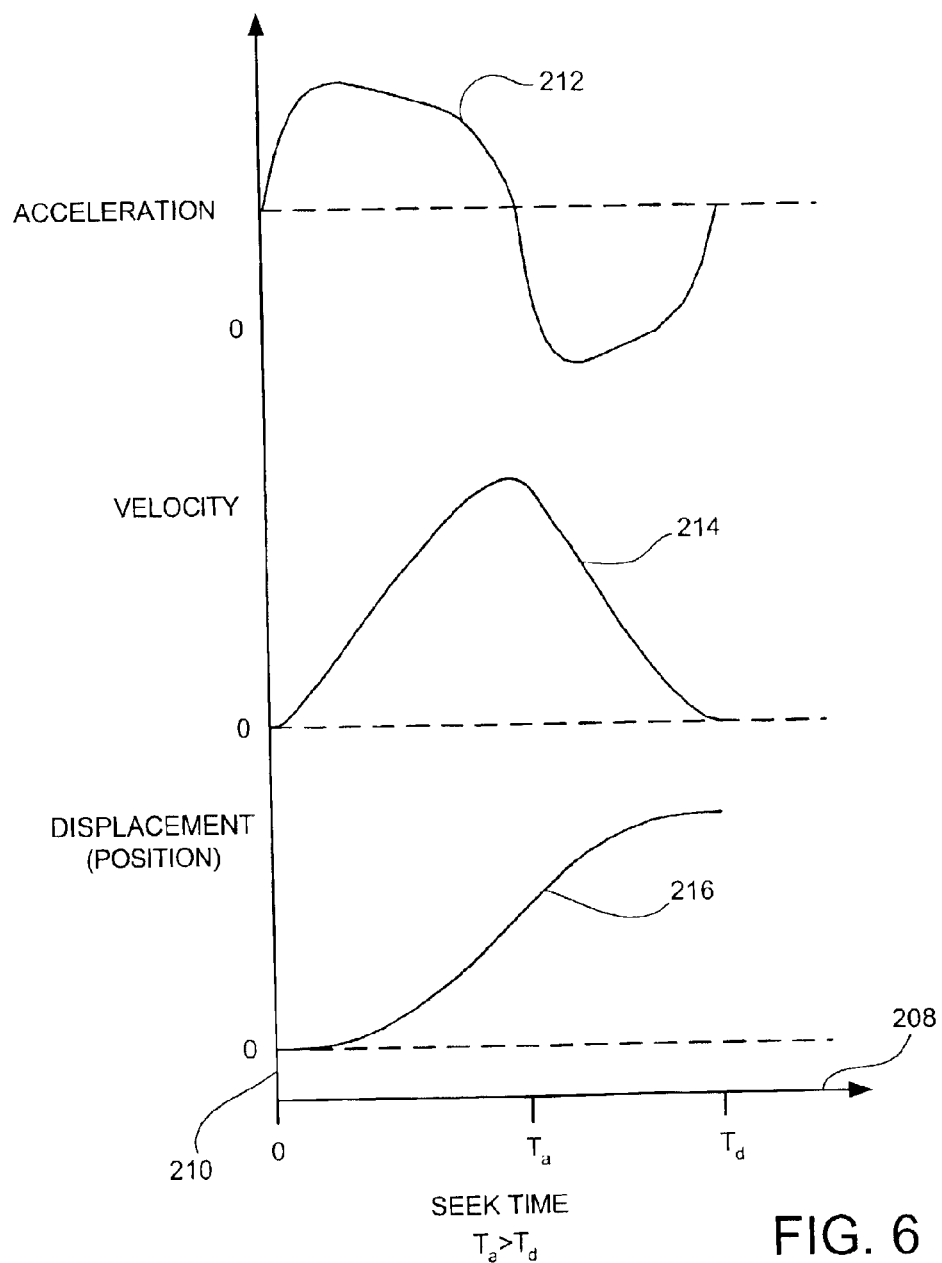
FIG. 6 correspondingly provides control profiles for acceleration, velocity and displacement when the acceleration time is not equal to the deceleration time.

FIG. 5 provides exemplary control profiles for an inversion model based on equation (11) with $T_a=T_d$. More particularly, FIG. 5 shows acceleration curve 202, velocity curve 204 and position curve 206, plotted against a common x-axis 208 for the time duration from 0 to T and a common amplitude y-axis 210. Similarly, FIG. 6 provides exemplary control profiles for an inversion model with $T_a>T_d$, with acceleration curve 212, velocity curve 214 and position curve 216. It will be noted that the deceleration portions of the curves 202, 212 of FIGS. 5 and 6 can be considered as being formed by performing an inversion of the acceleration portions of the curves about the horizontal axis 218.

Figure 7:
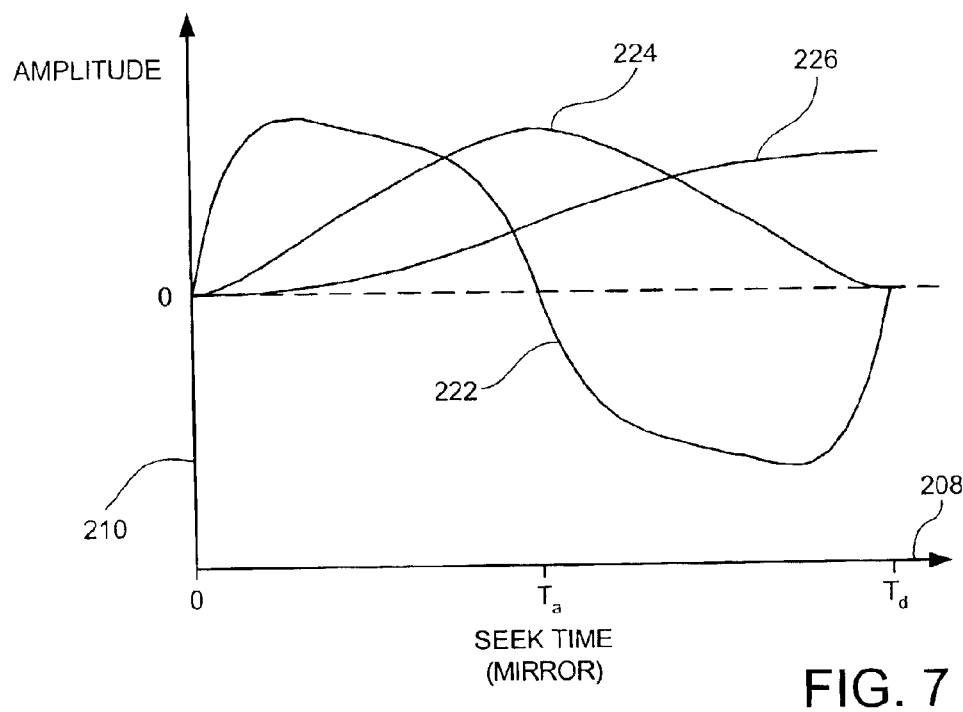
FIG. 7 shows acceleration, velocity and displacement control profiles using a mirrored approach so that the acceleration and deceleration stages are mirrored (symmetric).

As mentioned above, a mirroring scheme can alternatively be used, as shown in FIG. 7. More particularly, FIG. 7 includes mirrored acceleration, velocity and displacement curves 222, 224 and 226, respectively. For the mirroring scheme, the profiles at both acceleration and deceleration are symmetric; that is, $T_d$ is set equal to $T_a$, and $X_d$ is set equal to $X_a$. It will be noted that the curve 222 in FIG. 7 can be considered as having a deceleration portion that is formed by an inversion of the acceleration portion of the curve about both the vertical amplitude axis 210 and about the horizontal elapsed time axis 208.

The next consideration is whether to apply an intermediate coast stage between the respective acceleration and deceleration stages. A coasting stage is useful for longer seeks and generally involves allowing the head 112 to coast at the maximum velocity for a selected period of time prior to decelerating.

Figure 8:
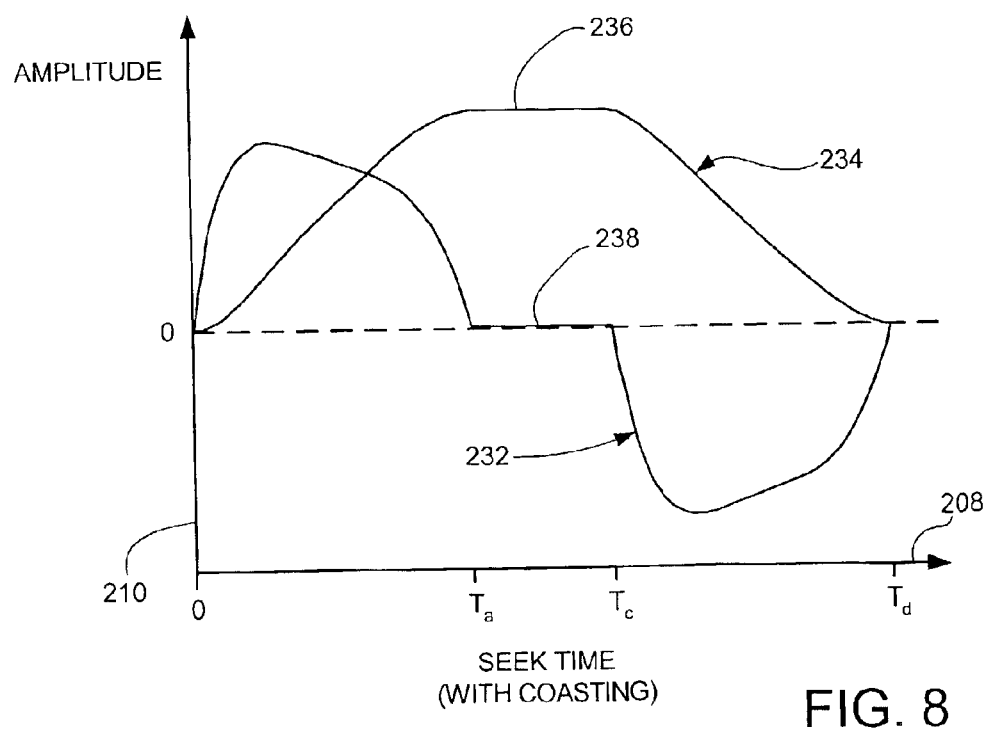
FIG. 8 provides acceleration and velocity control profiles with the use of a coast stage during which the selected head is allowed to coast for a selected time at a maximum velocity.

It is relatively straightforward to insert a coast stage in any of the different control profile schemes discussed above. The velocity at time $T_a$ will be known (see, e.g., equation (3)). Let $T_c$ and $X_c$ denote the interval and the distance of the coast stage, respectively. Thus, $$X_c=(F)(X_a/T_a)(T_c)$$

$$T=T_a+T_c+T_d \quad (12)$$

$$X=X_a+X_c+X_d=(1+(F)(T_c/T_a)+(H)(T_d/T_a))(X_a)$$

where F and H are constants preferably set equal to (18,589/9897) and (8671/9897), respectively. As for the deceleration stage, the generation formulae need only be shifted to the right on the time scale by an amount equal to $T_c$, that is, $G((t-T_a-T_c)/T_d)$. FIG. 8 shows an acceleration curve 232 and a deceleration curve 234 that employ a coast stage as formulated above. During the coast interval $(T_c-T_a)$, the velocity is maintained at the maximum velocity (portion 236) and the acceleration is nominally zero (portion 238).

Implementation of the time-domain polynomial generation terms to generate appropriate control profiles is preferably accomplished as follows. Referring back to the servo control circuit 120 of FIG. 2, it will be noted that the ARM device 126 outputs the appropriate current command signals to the VCM driver 130 to move the actuator 110. While it is possible that the ARM device 126 could be provided with sufficient processing capability to calculate the control profiles on the fly, in many instances placing such computational requirements upon the device will be impractical.

Figure 9:
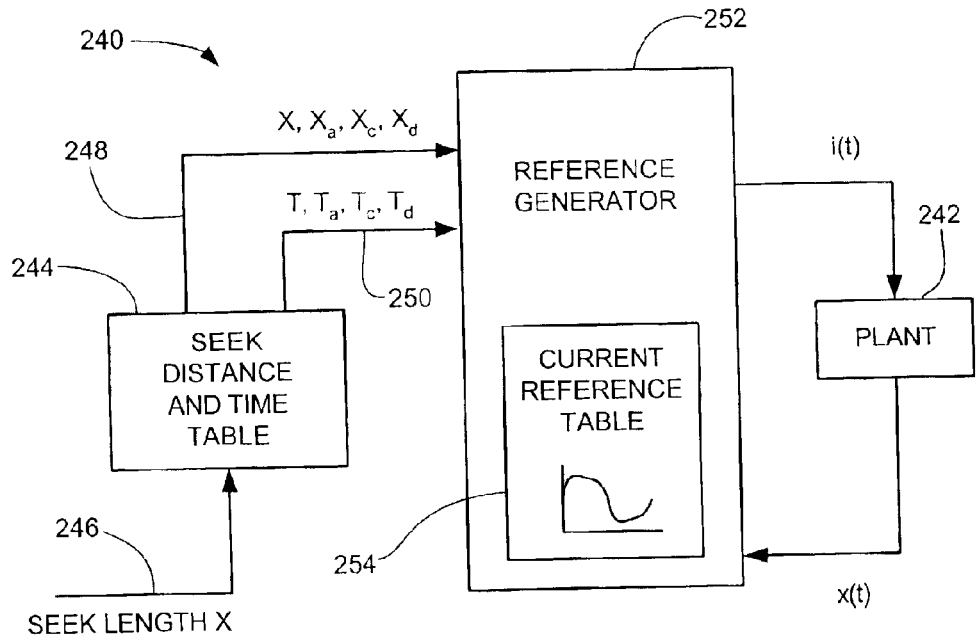
FIG. 9 provides a functional block representation of a portion of the servo control circuit of FIG. 2 in accordance with a preferred embodiment.

Thus, a table approach is preferably employed whereby one or more of the control profiles are stored in a normalized fashion in a table which are then accessed during operation to generate the appropriate current command values. FIG. 9 provides a first control circuit 240 representative of programming stored in the ARM memory 128 and utilized by the ARM 126 during operation.

The circuit 240 outputs current command values i(t) to a plant block 242 representative of the VCM driver 130, coil 114, head 112, disc 108, preamp 122 and demod 124 (FIG. 2). The output from the plant block 242 is shown to be a head position value x(t), although other outputs can be used.

The circuit 240 includes a seek time and distance table 244 which receives a seek length input (X) on path 246. The seek length input indicates the length of the next seek to be carried out (e.g., radial distance, number of tracks, etc.). It will be understood that the seek length input can represent an actual displacement distance for the seek (e.g., move 300 tracks inboard), or can identify the destination track, allowing the table to determine the displacement distance and direction based on the location of the current track over which the head 112 is positioned. The latter approach is particularly useful when adaptation is carried out to account for slight differences in motor response for different locations on the disc surfaces, or to account for slight differences from one device to the next.

The table 244 uses the seek length input to output a series of displacement values on path 248 including the acceleration distance $X_a$, the coast distance (if any) $X_c$, and the deceleration distance $X_d$. The table 244 further outputs a series of time interval values on path 250 including total seek time T, acceleration time $T_a$, coast time (if any) $T_c$, and deceleration time $T_d$.

The displacement and time interval values from paths 248, 250 are supplied to a reference generator 252. The reference generator 252 includes a second table 254, preferably comprising the $G_a(t)$ generation term of equation (1) normalized over the range of from 0 to 1.

During operation, the reference generator 252 calculates an index value (t/T) and solves for the corresponding $G_a(\text{index}(t))$ value from the table 254. A peak current amplitude value $I_A$ is next obtained (such as from equation (1)) and the reference generator 252 computes the appropriate value of i(t) in accordance with the relation:

$$i(t) = (I_A)G_a(\text{index}(t)) \tag{13}$$

In this way, the head 112 is moved in open loop fashion to nominally follow the appropriate control profiles to the destination track.

Figure 10:
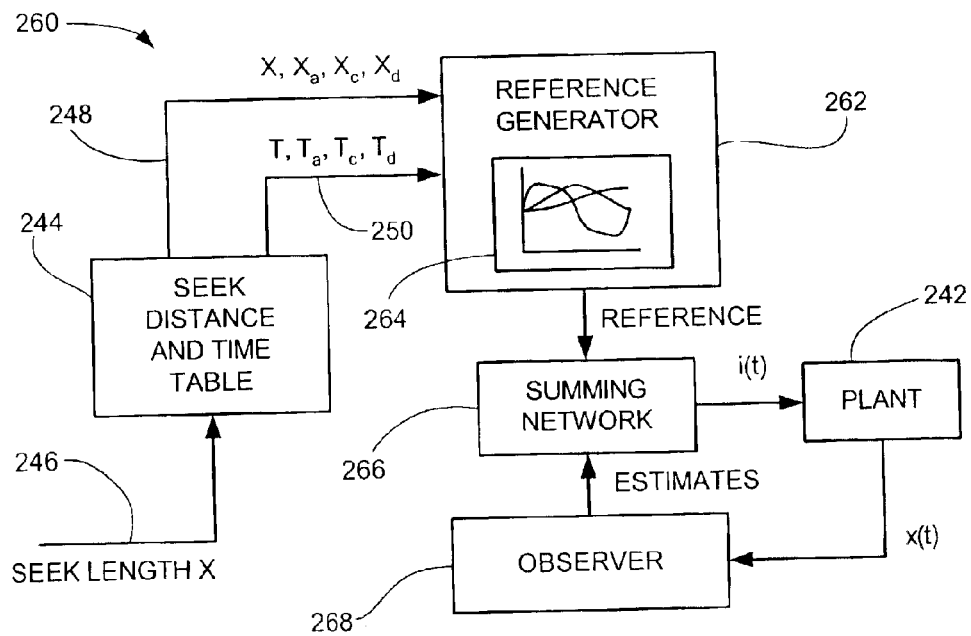
FIG. 10 provides a functional block representation of a portion of the servo control circuit of FIG. 2 in accordance with another preferred embodiment.

FIG. 10 provides a second control circuit 260 that can be utilized alternatively to, or in addition to, the circuit 240 in FIG. 9. As before, the circuitry of FIG. 10 is preferably representative of programming executed by the ARM device 126. Like reference numerals are used in FIG. 10 for the same or similar components shown in FIG. 9.

The circuit 260 in FIG. 10 is generally configured to carry out a position reference or a velocity controlled seek. The displacement and time interval values from paths 248, 250 are supplied to a second reference generator 262. The second reference generator 262 includes one or more tables (shown collectively at 264) that include displacement, velocity and/or acceleration profiles as generated above.

The second reference generator 262 operates generally as described above to output reference values which are combined by a summing network 266 with corresponding estimated or measured values from an observer circuit 268. The resulting output from the summing network 266 provides the current command values i(t) which are supplied as before to the plant 242. In this way, the head 112 is moved in a generally closed loop fashion to the destination track.

Figures 11, 12:
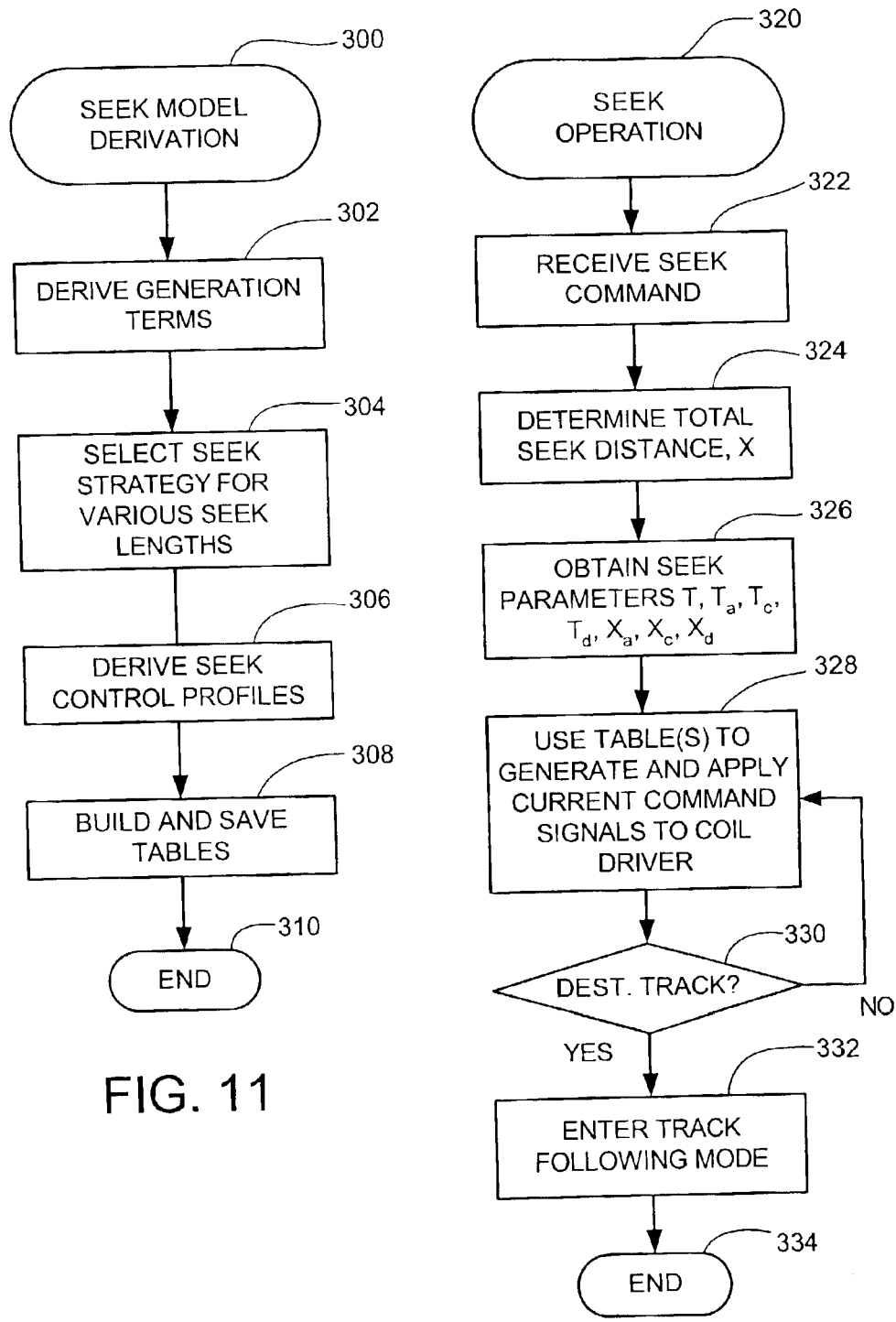
FIG. 11 is a flow chart for a SEEK MODEL DERIVATION routine.
FIG. 12 is a flow chart for a SEEK OPERATION routine.

FIG. 11 provides a flow chart for a SEEK MODEL DERIVATION routine 300, representative of steps carried out in accordance with preferred embodiments of the present invention to derive a seek model for a control object, such as the head 112 as discussed above. At step 302, at least one, and preferably all of the various generation terms of equation (1) are first derived, including the selection of appropriate coefficients as shown in equation (1b).

At step 304, the desired seek strategy is next formulated for seeks of various lengths. For example, the format of the deceleration stage and the inclusion (or omission) of a coast stage are determined during this step. In addition, as desired different strategies are selected for different lengths of seeks and locations of seeks with respect to disc radii.

The flow continues to step 306 wherein the desired seek control profiles are next derived. This is preferably carried out using equations (2), (11) and (12) and comprises one or more control profiles such as used by the circuits 240, 260 of FIGS. 9 and 10. Appropriate tables are next built and saved at step 308. These tables include the generation term profile tables 254, 264 and the seek distance and time table 244 in FIGS. 9 and 10, and can be adapted as desired for different locations or individual device characteristics. The process then ends at step 310.

Thereafter, seeks are carried out in accordance with a SEEK OPERATION routine 320 in FIG. 12, which begins with the receipt of a seek command at step 322. The total seek distance X is determined at step 324, and the various displacement and time interval seek parameter values are obtained at step 326.

The routine continues at step 328 wherein the tables are used to generate and apply current command signals to move the head 112. This process is continued as indicated by decision step 330 until the destination track is reached, after which the servo control circuit 120 enters track following mode at step 332 and the head 112 is caused to follow the destination track. The process therafter ends at step 334 and is repeated upon receipt of the next seek command.

It will now be understood that the present invention (as embodied herein and as claimed below) is generally directed to a method and apparatus for moving a control object, such as a data transducing head (such as 112) in a data storage device (such as 100), from an initial position to a destination position.

The method preferably includes providing a base generation term to describe a normalized trajectory of the control object away from the initial position and toward the destination position, the base generation term characterized as an at least sixth order time domain polynomial (such as by step 302); determining a control profile in relation to the base generation term, an acceleration distance and an acceleration time, wherein the acceleration distance is characterized as a displacement distance over which the control object is accelerated, and wherein the acceleration time is characterized as an elapsed time during which the control object is accelerated (such as by step 306); and moving the control object in relation to the control profile (such as by step 328).

The apparatus preferably includes a table (such as 254, 264) comprising values representative of a base generation term which describes a normalized trajectory of the control object away from the initial position and toward the destination position, the base generation term characterized as an at least sixth order time domain polynomial; a reference generator (such as 252, 262) coupled to the table which generates a control profile in relation to the base generation term, an acceleration distance and an acceleration time, wherein the acceleration distance is characterized as a displacement distance over which the control object is accelerated, and wherein the acceleration time is characterized as an elapsed time during which the control object is accelerated; and a driver circuit (such as 130) coupled to the reference generator which outputs current in relation to the control profile to move the control object.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. A method for moving a control object from an initial position to a destination position, comprising:

providing a base generation term to describe a normalized trajectory of the control object away from the initial position and toward the destination position;

determining a control profile in relation to the base generation term, an acceleration distance and an acceleration time, wherein the acceleration distance is characterized as a displacement distance over which the control object is accelerated, and wherein the acceleration time is characterized as an elapsed time during which the control object is accelerated; and moving the control object in relation to the control profile.

2. The method of claim 1, further comprising a prior step of generating the acceleration distance and the acceleration time in relation to a total displacement distance value indicative of a distance interval between the initial position and the destination position.

3. The method of claim 1, wherein the control profile of the determining step is further determined in relation to a deceleration distance and a deceleration time, respectively characterized as a displacement distance and an elapsed time during which the control object is decelerated to the destination position.

4. The method of claim 3, wherein the control profile of the determining step is further determined in relation to a coast distance and a coast time, characterized as a displacement distance and an elapsed time, respectively, during which the control object coasts at a maximum velocity toward the destination position.

5. The method of claim 3, wherein the deceleration time is set nominally equal to the acceleration time.

6. The method of claim 3, wherein the deceleration time is set to a value less than the acceleration time.

7. The method of claim 1, wherein the base generation term is characterized as an at least sixth order time domain polynomial.

8. The method of claim 1, wherein the moving step comprises applying current to a motor coupled to the control object in relation to the control profile.

9. The method of claim 1, wherein the base generation term of the providing step is characterized as a selected one of an acceleration generation term which describes a normalized acceleration of the control object, a velocity generation term which describes a normalized velocity of the control object and a position generation term which describes a normalized displacement of the control object.

10. The method of claim 9, wherein the base generation term is characterized as a first base generation term, wherein the providing step further comprises providing a second base generation term which is characterized as a remaining one of the acceleration generation term, the velocity generation term, and the position generation term, and wherein the control profile of the determining step is further determined in relation to the second base generation term.

11. The method of claim 1, wherein the base generation term of the providing step is graphically characterized as a curve plotted against a vertical amplitude axis and a horizontal elapsed time axis, and wherein the control profile of the determining step utilizes the base generation term to describe an acceleration trajectory during which the control object is accelerated and further utilizes the base generation term to describe a deceleration trajectory during which the control object is decelerated to the destination position.

12. The method of claim 11, wherein the deceleration trajectory of the control profile of the determining step is formed in relation to an inversion of the base generation curve about the horizontal axis.

13. The method of claim 11, wherein the deceleration trajectory of the control profile of the determining step is formed in relation to an inversion of the base generation curve about the horizontal axis and about the vertical axis.

14. The method of claim 1, wherein the determining step comprises providing a table comprising values representative of the base generation term, and generating the control profile in relation to the table of values.

15. The method of claim 1, wherein the control object comprises a data transducing head which is moved adjacent tracks defined on a data recording surface.

16. An apparatus which moves a control object from an initial position to a destination position, comprising:

a table comprising values representative of a base generation term which describes a normalized trajectory of the control object away from the initial position and toward the destination position;

a reference generator coupled to the table which generates a control profile in relation to the base generation term, an acceleration distance and an acceleration time, wherein the acceleration distance is characterized as a displacement distance over which the control object is accelerated, and wherein the acceleration time is characterized as an elapsed time during which the control object is accelerated; and a driver circuit coupled to the reference generator which outputs current in relation to the control profile to move the control object.

17. The apparatus of claim 16, wherein the table and the reference generator are realized in programming utilized by a programmable processor device.

18. The apparatus of claim 16, further comprising a second table which outputs the acceleration time and the acceleration distance in relation to a total displacement distance value indicative of a distance interval between the initial position and the destination position.

19. The apparatus of claim 16, wherein the reference generator further determines the control profile in relation to a deceleration distance and a deceleration time, characterized as a displacement distance and an elapsed time, respectively, during which the control object is decelerated to the destination position.

20. The apparatus of claim 16, wherein the reference generator further determines the control profile in relation to a coast distance and a coast time, characterized as a displacement distance and an elapsed time, respectively, during which the control object coasts at a maximum velocity toward the destination position after acceleration and prior to deceleration of the control object.

21. The apparatus of claim 16, wherein the driver circuit applies the current to a motor coupled to the control object.

22. The apparatus of claim 16, wherein the base generation term of the table is characterized as a selected one of an acceleration generation term which describes a normalized acceleration of the control object, a velocity generation term which describes a normalized velocity of the control object and a position generation term which describes a normalized displacement of the control object.

23. The apparatus of claim 16, wherein the base generation term of the table is characterized by an acceleration generation term $G_a(\tau)$ defined in accordance with a relationship: $G_a(\tau)=(A6)(\tau)^6+(A5)(\tau)^5+(A4)(\tau)^4+(A3)(\tau)^3+(A2)(\tau)^2+(A1)(\tau)$, where the value $\tau$ is a normalized time value over a selected range, and A1, A2, A3, A4, A5 and A6 represent selected non-zero coefficients.

24. The apparatus of claim 23, wherein the control profile is characterized as a current command profile $i_a(t)$ defined in accordance with a relationship: $i_a(t)=(Kpt)(D)(X_a/T^2_a)G_a(t/T_a)$, where Kpt is a gain value, D is a selected constant, $X_a$ is the acceleration distance, $T_a$ is the acceleration time, t is an instantaneous time value ranging from 0 to $T_a$, and $G_a(t/T_a)$ is a solution of the acceleration generation term with $\tau=(t/T_a)$.

25. The apparatus of claim 16, wherein the control object comprises a data transducing head which is moved adjacent tracks defined on a data recording surface.

* * * * *